United States Patent [19]
Attaway, III et al.

[11] Patent Number: 5,948,260
[45] Date of Patent: Sep. 7, 1999

[54] PROCESS FOR BIOREDUCTION OF PROPELLEANT WASTEWATER

[75] Inventors: Hubert H. Attaway, III, Charleston, S.C.; John F. Shanahan, Lakeland; James A. Hurley, Panama City, both of Fla.

[73] Assignee: The United States of America as represented by the Secretary of the Air Force, Washington, D.C.

[21] Appl. No.: 09/061,351

[22] Filed: Apr. 13, 1998

[51] Int. Cl.$^6$ .................................. C02F 3/30; C02F 1/58
[52] U.S. Cl. ........................... 210/603; 210/605; 210/611; 210/612
[58] Field of Search ..................................... 210/601, 604, 210/603, 605, 610–612, 614, 630, 631, 742, 743, 903

[56] References Cited

U.S. PATENT DOCUMENTS

| | | | |
|---|---|---|---|
| 3,755,156 | 8/1973 | Yakovlev et al. | 210/605 |
| 3,943,055 | 3/1976 | Korenkov et al. | 210/611 |
| 4,696,746 | 9/1987 | Ghosh et al. | 210/603 |
| 4,696,747 | 9/1987 | Verstraete et al. | 210/603 |
| 5,116,505 | 5/1992 | Lourens et al. | 210/603 |
| 5,302,285 | 4/1994 | Attaway et al. | 210/605 |
| 5,651,890 | 7/1997 | Trost | 210/603 |
| 5,811,255 | 9/1998 | Hunter et al. | 210/614 |

*Primary Examiner*—Thomas G. Wyse
*Attorney, Agent, or Firm*—Bobby D. Scearce; Thomas L. Kundert

[57] ABSTRACT

A process for treatment and disposal of wastewater having dissolved perchlorate salts is described and includes the steps of adding to the wastewater in a hydrogen gaslift recycle reactor a mixed bacterial culture containing the specific bacterium HAP1 for reducing the perchlorate ion to chloride in the wastewater; maintaining proper nutrient and environmental conditions for HAP1 to optimally reduce perchlorate in the wastewater; and discharging effluent wastewater from the gaslift reactor to an aerobic reactor and maintaining proper nutrient and environmental conditions for the optimal conversion of soluble organics to carbon dioxide and sludge.

15 Claims, 1 Drawing Sheet

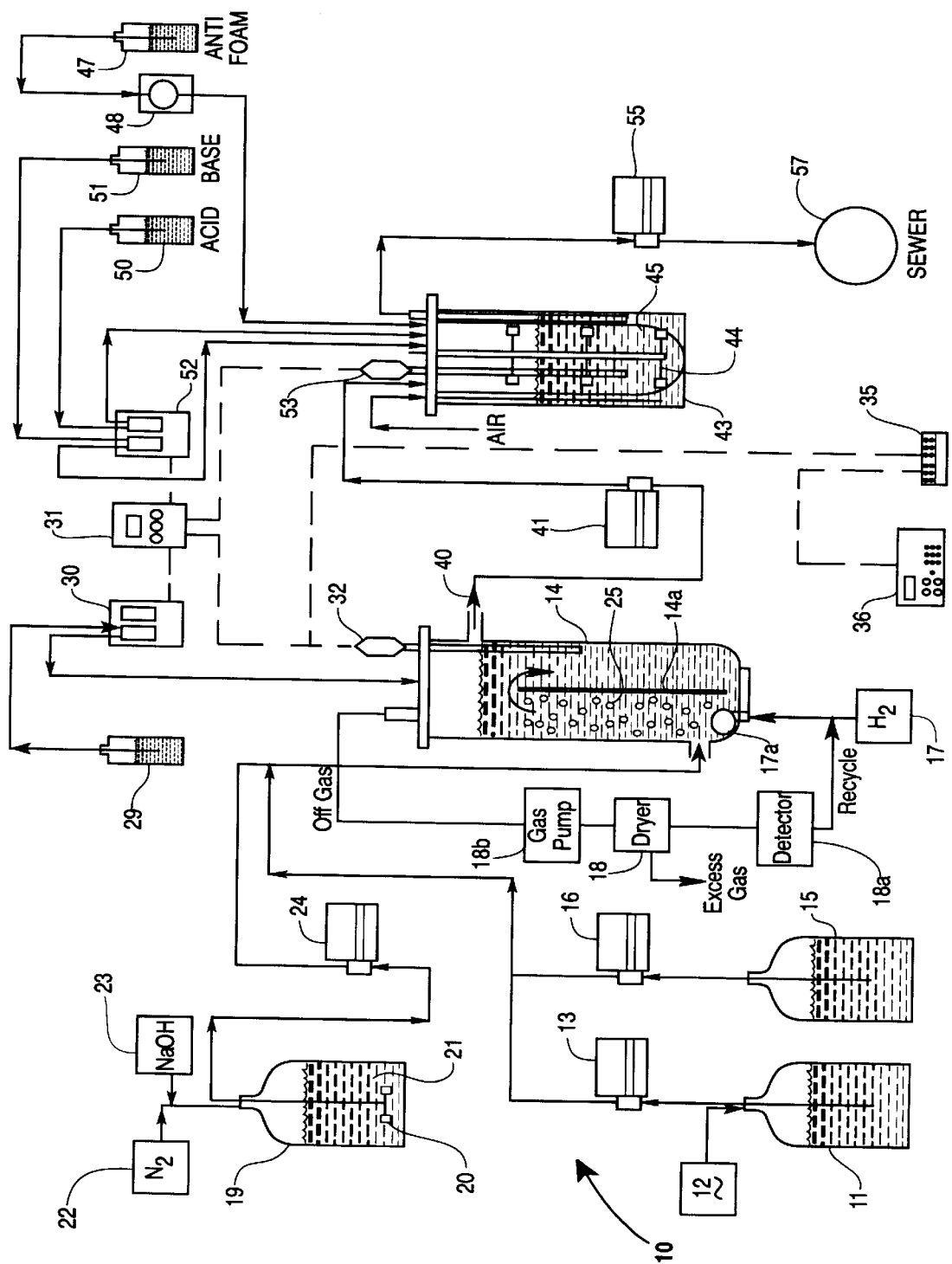

PROCESS FOR BIOREDUCTION OF PROPELLEANT WASTEWATER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for biologically treating wastewaters, contaminated groundwaters or the like, and more particularly to an improved process for treatment and disposal of wastewater generated from manufacture, processing or disposal of ammonium perchlorate materials and remediation of perchlorate contaminated groundwater or soil washwater.

Class 1.1 rocket motor propellants typically contain about 14% ammonium perchlorate, 14% HMX and 30% nitroglycerine as oxidizers, 20% aluminum fuel and 22% nitrocellulose binder. Class 1.3 propellants typically contain 70% ammonium perchlorate oxidizer, 17% aluminum fuel and 13% PBAN binder. Large amounts of wastewater containing 10% or more by weight of ammonium perchlorate may be generated from propellant manufacture or processing or from rocket motor washout operations.

Prior methods for disposal of ammonium perchlorate based propellants generally consisted of open fuel burning or static firing of fueled rocket motors. Uncontrolled open burning may result in the spread of combustion products or unexploded material to areas surrounding the burn site and therefore represents a source of contamination for soil and groundwater. Open burning and static motor firing result in the release to the environment of large amounts of hydrogen chloride, nitrogen oxides and unburned hydrocarbons, and are considered environmentally unacceptable disposal methods.

Prior art processes for treatment of industrial wastewaters include U.S. Pat. No. 3,755,156 to Yakovlev et al, entitled "Method for Biological Treatment of Industrial Waste Water," describing the biochemical reduction of chromium or chlorine inorganic oxygen containing compounds in industrial wastewaters by mixing the wastewaters with municipal sewage having a biological oxygen demand (BOD) which exceeds the amount of oxygen in the inorganic chromium and chlorine oxides. The combined wastewaters, municipal sewage and recycled acclimated sludge are held under anaerobic conditions with the bioreduction of perchlorates occurring at volumetric rates of about 12 mg $ClO_4^-$/hr per liter. The treated wastewater is then passed to an aeration chamber for further reduction of BOD. U.S. Pat. No. 3,943,055 to Korenkov et al, entitled "Process for Purification of Industrial Waste Waters from Perchlorates and Chlorates," describes the controlled addition of the microorganism *Vibrio dechloraticans Cuznesove* B-1168 to a mixture of perchlorate or chlorate bearing industrial wastewater and municipal sewage with the bioreduction of those compounds to chloride salts.

The process described in U.S. Pat. No. 5,302,285 to Attaway et al, entitled "Propellant Wastewater Treatment Process" (herein referred to as Attaway '285), provided a substantial improvement to the then existing art by providing a two-stage anaerobic-aerobic process for the biological reduction of wastewater containing ammonium perchlorate. Wastewater treatment according to Attaway '285 included the steps of reducing perchlorate to chloride in a first stage anaerobic reactor using a mixed bacterial culture containing a specific unique microorganism HAP1, which uses perchlorate as its terminal acceptor, under controlled pH, nutrient and temperature conditions, followed by reduction in a second stage aerobic reactor of the organics produced in the anaerobic reactor to carbon dioxide and sludge, the effluent liquid being disposable to a conventional sanitary sewer system. The Attaway '285 process resulted in reduction of perchlorate wastewater concentrations as high as 7750 mg per liter (about a 26 fold improvement over the prior art); HAP1 demonstrated a specific degradation rate of at least 1492 mg $ClO_4^-$/hr per gram of dry biomass (about a 21 fold improvement over the prior art); the process demonstrated continuous volumetric degradation rate at least 2-fold higher (221 mg $ClO_4^-$/hr per liter) than the prior art at 10-fold higher perchlorate concentrations (3000 mg per liter).

The invention is a significant improvement over Attaway '285 and comprises treatment of propellant wastewaters with specific nutrient additions in a novel anaerobic gaslift bioreactor to reduce perchlorate to chloride and nitrate to nitrogen. The gaslift reactor is populated with a mixed bacterial consortium including HAP1 as the primary component. The liquid in the reactor is sparged with hydrogen gas which serves as the biochemical reductant for reducing perchlorate. Tandem use of this specific nutrient composition in a hydrogen rich environment allows an increase in the ratio of the perchlorate reducing bacterium HAP1 to other non-perchlorate reducing members of the consortium and provides unexpectedly higher efficiency for perchlorate reduction. In the process of the invention, the required nutrient quantities are significantly less than required in Attaway '285, and the chemical oxygen demand (COD), solids and sludge produced in the anaeribic process are greatly reduced as compared to the Attaway '285 process.

It is therefore a principal object of the invention to provide a process for treatment and disposal of industrial wastewaters.

It is another object of the invention to provide an improved process for treatment and disposal of wastewater containing perchlorate-based materials.

It is another object of the invention to provide an economical and environmentally safe process for biotreatment of wastewaters containing perchlorate-based materials resulting from rocket motor washout processes, or of perchlorate-contaminated soils or groundwater.

These and other objects of the invention will become apparent as a detailed description of representative embodiments proceeds.

SUMMARY OF THE INVENTION

In accordance with the foregoing principles and objects of the invention, an improved process for treatment and disposal of wastewater having dissolved perchlorate salts is described and includes the steps of adding to the wastewater in a hydrogen gaslift recycle reactor a mixed bacterial culture containing the specific bacterium HAP1 for reducing the perchlorate ion to chloride in the wastewater; maintaining proper nutrient and environmental conditions for HAP1 to optimally reduce perchlorate in the wastewater; and discharging effluent wastewater from the gaslift reactor to an aerobic reactor and maintaining proper nutrient and environmental conditions for the optimal conversion of soluble organics to carbon dioxide and sludge.

DESCRIPTION OF THE DRAWINGS

The invention will be more clearly understood from the following detailed description of representative embodiments thereof read in conjunction with the accompanying drawing which is a schematic of a representative system utilizing HAP1 in a mixed culture for biotreatment of perchlorate contaminated water in accordance with the invention.

DETAILED DESCRIPTION OF THE INVENTION

The entire contents and teachings of the Attaway '285 patent describing a process for treatment and disposal of wastewater having dissolved perchlorate salts are incorporated here by reference.

A purified culture of HAP1 has been deposited with the American Type Culture Collection Patent Depository, 12301 Parklawn Drive, Rockville, Md. 20852. A purified culture of HAP1 and all mixed cultures associated with HAP1 are also deposited on premise at Armstrong Laboratory (EQ-OL), 139 Barnes Road, Bldg 1117, Tyndall Air Force Base, Fla. 32403. The characteristics of HAP1 are described in Attaway '285.

Reference is now made to the accompanying drawing, which is a schematic of a representative system 10 for practicing the invention. Wastewater containing dissolved ammonium perchlorate based solid propellant may contain dissolved perchlorate salts in amounts up to about 12 weight per cent (wt %) (120 grams/liter (g/l)) and trace quantities of nitro compounds such as nitroglycerine, nitrate esters, RDX, HMX and nitrocellulose. Wastewater having dissolved perchlorate contained in feed tank 11 is first amended with dipotassium phosphate and disodium phosphate from a source 12 thereof such that the weight ratio of dissolved constituents within the wastewater feed is in the range of about 1 to 0.25 $K_2HPO_4$: 0.3 to 0.07 $Na_2HPO_4$: 1 $ClO_4^-$, respectively, and preferably at least 0.5 $K_2HPO_4$: 0.17 $Na_2HPO_4$: 1 $ClO_4^-$. In accordance with the teachings of the invention, wastewater feed from tank 11 is transferred by pump 13 to gaslift recycle reactor 14 and blended with dilution water from tank 15 and pump 16 to achieve an ammonium perchlorate concentration within reactor 14 not to exceed 9 g/l and preferably less than about 7 g/l.

Water mixture 21 of organic nutrients and trace minerals is prepared within tank 19 having agitator 20, and transferred to gaslift recycle reactor 14 through pump 24. Mixture 21 includes commercial soluble yeast extract (<2% solids), nitrilotriacetic acid, fumaric acid, magnesium sulfate heptahydrate, manganese sulfate monohydrate and iron sulfate heptahydrate such that the weight ratio when mixed within reactor 14 with the diluted perchlorate containing liquid 25 is in the ranges of about 3.4 to 1.7 fumaric acid: 0.34 to 0.17 yeast extract: 0.04 to 0.02 $MgSO_4*7H_2O$: 0.02 to 0.01 nitrilotriacetic acid: 0.006 to 0.003 $MnSO_4*H_2O$: 0.0014 to 0.0007 $FeSO_4*7H_2O$, respectively, and at least 1.7 fumaric acid: 0.17 yeast extract: 0.02 $MgSO_4*7H_2O$: 0.01 nitrilotriacetic: 0.003 $MnSO_4*H_2O$: 0.0007 $FeSO_4*7H_2O$. Nutrient mixture 21 within tank 19 should be maintained at pH below about 1.5 and under a nitrogen atmosphere as from nitrogen source 22 to prevent microbial growth prior to use. Prior to transfer to reactor 14, nutrient mixture 21 is neutralized to pH of about 7.1 by in-line addition of 30–50% sodium hydroxide 23. Nutrient mixture 21 is transferred to reactor 14 and mixed within reactor 14 with wastewater from tank 11 and dilution water from tank 15 to produce a weight ratio of organic nutrients to perchlorate ion at or about 1.8:1.

Liquid 25 within reactor 14 is sparged with hydrogen from source 17 connected to gas sparger 17a defined in the base of reactor 14 alongside a baffle 14a in such a manner as to provide both liquid mixing and optimum hydrogen gas dissolution into liquid 25. Offgas from the top of reactor 14 containing unconsumed hydrogen is continuously dried through dryer 18 and recycled through reactor 14 to minimize hydrogen usage. A headspace detector 18a determines when the hydrogen concentration in the recycle gas falls below an optimum level and triggers input of additional hydrogen from source 17 while purging excess depleted gas through a vent.

Inside reactor 14 perchlorate ion is reduced to chloride in liquid 25. Liquid 25 within reactor 14 is mixed by the flow of recycle gas mediated by gas pump 18b, and is populated predominantly with HAP1 and may contain trace quantities of other microorganisms capable of fermenting the organic nutrient source. HAP1 is the only organism in the culture which can reduce perchlorate to chloride and under the above described growth conditions exceeds other non-perchlorate reducing organisms by 450–1000%. The non-perchlorate degrading population composition is subject to fluctuation as reactor 14 is open to the environment and is not operated in a sterile manner. The biochemistry within reactor 14 excluding perchlorate reduction is best understood by reference to *Bacterial Metabolism*, G. Gottschalk, Chap 8, "Bacterial Fermentations," Springer-Verlag (1979); "Anaerobic Wastewater Treatment," *Advances in Biochemical Engineering/Biotechnology*, #29, Springer-Verlag, pp 83–115 (1984): and *Wastewater Engineering*, Metcalf & Eddy, Inc., McGraw-Hill Book Co., Chapters 10 and 12 (1972), the entire teachings of which are incorporated here by reference. The mixed culture containing HAP1 is maintained by weekly transfers on the following medium: 1.5 g/l $K_2HPO_4$, 0.5 g/l $Na_2HPO_4$, 3.5 g/l $NH_4ClO_4$, 7 g/l sodium fumarate, 30 mg/l nitrilotriacetic acid, 2 mg/l $FeSO_4*7H2O$, 60 mg/l $MgSO_4*7H_2O$, 10 mg/l $MnSO_4*H_2O$, pH at 7.1. An active perchlorate reducing culture (10 vol %) is used to inoculate reactor 14. The anaerobic growth on sodium fumarate may raise the pH within the reactor liquid 25, although this is not typical with the current phosphate buffer present. The culture functions at pH 6.5–8.0 and 20°–42° C. (optimally about pH 7.1 and 40° C.) in a perchlorate concentration less than 9000 ppm. Since reduction of perchlorate ion occurs beneficially at pH 6.5–8.0, acid in the form of HCL 29 may be added to reactor 14 using pump 30 controlled by pH meter/controller 31 connected to pH/redox probe 32 if the pH increases. Flow rates into and out of reactor 14 are adjusted to maintain a liquid retention time within reactor 14 of about 8–40 hours, dependent on perchlorate concentration. Anaerobic microbial growth on the nutrients and hydrogen infusion maintains a low reduction/oxidation potential (less than −300 mV) in reactor 14 for optimum performance. Redox potential is monitored by probe 32 through switchbox 35 and ion analyzer 36.

Perchlorate depleted liquid effluent 40 from reactor 14 is transferred by pump 41 into aerobic reactor 43 for reducing organic content of effluent 40, and is treated thereafter in manner substantially as described in Attaway '285.

Effluent 40 flow rate into reactor 43 is maintained at a level consistent with maintaining a desired resident time within reactor 14 as suggested above. Air is circulated through reactor 43 at a rate sufficient to not limit biological oxidation. Reactor 43 is stirred using rotatable impeller 44. To prevent excessive foaming from the aeration and mixing of liquid 45 in reactor 43, antifoam 47 is added as needed through pump 48. Within reactor 43 organics which were produced in reactor 14 are biologically converted to carbon dioxide and sludge. The biochemistry within reactor 43 is best understood by reference to *Wastewater Engineering*, supra. The solution in reactor 43 is best maintained at about pH 7.0–8.5 (preferably 7.0) and a temperature of about 32°–37° C. In order to maintain the desired pH, acid 50 in the form of HCl or base 51 in the form of NaOH may be added as needed using pump 52 controlled by meter/controller 31 connected to probe 53. Effluent from reactor 43 may be discharged using pump 55 and may be of sufficient quality for discharge directly to sanitary sewer 57. Sludge from reactor 43 comprising principally cell mass may be removed and disposed of by settling or filtration, drying and landfill.

The invention provides a significant reduction in amounts of organic nutrients required to be added to the waste stream. In Attaway '285, the minimum ratio of organic nutrients to perchlorate ion was 4:1, whereas the ratio is as low as 1.8:1 in the present invention. A significant reduction in the amount of solids, sludge and COD, leaving the anaerobic reactor is realized. The COD ranges for the effluent were 2,600–3,600 mg/l as compared to 14,000–30,000 mg/l in Attaway '285. In Attaway '285 HAP1 concentrations in the reactor during optimum conditions were about 50% relative to the other members of the mixed culture, whereas in the improved system of the present invention the HAP1 concentrations were substantially higher at about 450% or greater, which permits an increase of about 20% or more in the volumetric degradation of ammonium perchlorate over Attaway '285.

The invention therefore provides an improved process for bioreduction of wastewaters containing dissolved perchlorates. It is understood that modifications to the invention may be made as might occur to one with skill in the field of invention within the scope of the appended claims. All embodiments contemplated hereunder which achieve the objects of the invention have therefore not been shown in complete detail. Other embodiments may be developed without departing from the spirit of the invention or from the scope of the appended claims.

What is claimed:

1. A method for treating wastewater to remove ammonium perchlorate dissolved therein, comprising the steps of:

(a) providing a substantially closed hydrogen gaslift reactor having an inlet for inserting said wastewater thereinto and an outlet for discharge of effluent liquid therefrom, said gaslift reactor being of preselected size to provide a preselected resident time of said wastewater therewithin at preselected flow rate therethrough;

(b) providing a source of an organism from a sewage enrichment culture for reducing perchlorate ion in said wastewater to chloride ion;

(c) adding said organism to said wastewater within said gaslift reactor;

(d) providing a source of hydrogen operatively connected to said gaslift reactor and providing means for circulating hydrogen from said source through said gaslift reactor;

(e) circulating hydrogen from said source through said gaslift reactor;

(f) adjusting the pH of said wastewater within said gaslift reactor to about 6.5 to 8.0.

(g) discharging effluent liquid from said gaslift reactor at a rate corresponding to said preselected resident time of said wastewater within said gaslift reactor;

(h) providing a substantially closed aerobic reactor having an inlet for inserting said effluent liquid thereinto and an outlet for discharge of treated liquid therefrom, said aerobic reactor being of preselected size to provide a preselected resident time of said effluent liquid therewithin at preselected flow rate therethrough;

(i) circulating air into said aerobic reactor and into said effluent liquid therein to convert soluble organics contained within said effluent liquid to carbon dioxide and sludge;

(j) adjusting the pH of said effluent liquid within said aerobic reactor to about 7.0 to 8.5; and (k) discharging treated liquid from said aerobic reactor.

2. The method of claim 1 wherein said organism comprises HAP1.

3. The method of claim 1 wherein said wastewater within said gaslift reactor is diluted with dilution water to a concentration of ammonium perchlorate of less than about 7 grams per liter prior to adjusting the pH of said wastewater within said gaslift reactor.

4. The method of claim 1 wherein the pH of said wastewater within said gaslift reactor is adjusted to about 7.1.

5. The method of claim 1 wherein the step of adjusting the pH of said wastewater is performed by adding a caustic material selected from the group consisting of sodium hydroxide and potassium hydroxide.

6. The method of claim 1 wherein the temperature of said wastewater within said gaslift reactor is maintained at about 40° C.

7. The method of claim 1 further comprising the step of adding growth nutrient to said wastewater within said gaslift reactor.

8. The method of claim 7 wherein said growth nutrient is selected from the group consisting of dry brewers yeast, cottonseed protein and whey powder.

9. The method of claim 1 wherein the step of adjusting the pH of said effluent liquid is performed by adding an acid.

10. The method of claim 1 wherein the temperature of liquid within said aerobic reactor is maintained at 32° to 37° C.

11. A method for treating wastewater to remove ammonium perchlorate dissolved therein, comprising the steps of:

(a) diluting said wastewater with dilution water to a concentration of ammonium perchlorate in the diluted wastewater of less than about 9 grams per liter;

(b) providing a substantially closed hydrogen gaslift reactor having an inlet for inserting said wastewater thereinto and an outlet for discharge of effluent liquid therefrom, said gaslift reactor being of preselected size to provide a preselected resident time of said wastewater therewithin at preselected flow rate therethrough;

(c) providing a source of an organism comprising HAP1 from a sewage enrichment culture for reducing perchlorate ion in said wastewater to chloride ion;

(d) adding said organism to said wastewater within said gaslift reactor;

(e) adding growth nutrient to said diluted wastewater within said gaslift reactor for promoting growth and operation of said organism within said gaslift reactor;

(f) providing a source of hydrogen operatively connected to said gaslift reactor and providing means for circulating hydrogen from said source through said gaslift reactor;

(g) circulating hydrogen from said source through said gaslift reactor;

(h) adjusting the pH of said diluted wastewater within said gaslift reactor to about 6.5 to 8.0.

(i) maintaining the temperature of said diluted wastewater within said gaslift reactor at about 40° C.;

(j) discharging effluent wastewater from said gaslift reactor at a rate corresponding to a resident time of said diluted wastewater within said gaslift reactor of about 44 to 80 hours;

(k) providing a substantially closed aerobic reactor having an inlet for inserting said effluent wastewater thereinto and an outlet for discharge of treated wastewater therefrom, said aerobic reactor being of preselected size to provide a preselected resident time of said effluent wastewater therewithin at preselected flow rate therethrough;

(l) circulating air into said aerobic reactor and into said effluent wastewater therein to convert soluble organics contained in said effluent wastewater to carbon dioxide and sludge;

(m) adjusting the pH of said effluent wastewater within said aerobic reactor to about 7.0 to 8.5;

(n) maintaining the temperature of said effluent wastewater in said aerobic reactor at 32° to 37° C.; and (o) discharging treated wastewater from said aerobic reactor.

12. The method of claim 11 wherein said growth nutrient is selected from the group consisting of dry brewers yeast, cottonseed protein and whey powder, and said growth nutrient is added to said wastewater in an amount equivalent to at least four times the weight of said dissolved perchlorate ion.

13. The method of claim 11 wherein the pH of said diluted wastewater within said gaslift reactor is adjusted to about 7.1.

14. The method of claim 11 wherein the step of adjusting the pH of said diluted wastewater is performed by adding a caustic material selected from the group consisting of sodium hydroxide and potassium hydroxide.

15. The method of claim 11 wherein the step of adjusting the pH of said effluent wastewater within said aerobic reactor is performed by adding an acid.

* * * * *